(12) United States Patent
Lee et al.

(10) Patent No.: US 11,394,269 B2
(45) Date of Patent: Jul. 19, 2022

(54) SERIES ELASTIC ACTUATOR, METHOD FOR CONTROLLING SERIES ELASTIC ACTUATOR AND SYSTEM THEREOF

(71) Applicant: RAINBOW ROBOTICS, Daejeon (KR)

(72) Inventors: Jung Ho Lee, Daejeon (KR); Jung Woo Heo, Daejeon (KR); Jeong Soo Lim, Daejeon (KR)

(73) Assignee: RAINBOW ROBOTICS, Daejeon (KR)

( * ) Notice: Subject to any disclaimer, the term of this patent is extended or adjusted under 35 U.S.C. 154(b) by 1057 days.

(21) Appl. No.: 16/063,957

(22) PCT Filed: Mar. 5, 2018

(86) PCT No.: PCT/KR2018/002564
§ 371 (c)(1),
(2) Date: Jun. 19, 2018

(87) PCT Pub. No.: WO2018/174428
PCT Pub. Date: Sep. 27, 2018

(65) Prior Publication Data
US 2021/0013773 A1    Jan. 14, 2021

(30) Foreign Application Priority Data

Mar. 24, 2017 (KR) .................. 10-2017-0037706
May 2, 2017 (KR) .................. 10-2017-0056191

(51) Int. Cl.
*B25J 17/00* (2006.01)
*H02K 7/00* (2006.01)
(Continued)

(52) U.S. Cl.
CPC .............. *H02K 7/003* (2013.01); *B25J 9/126* (2013.01); *B25J 13/085* (2013.01); *B25J 19/027* (2013.01); *H02K 11/215* (2016.01)

(58) Field of Classification Search
CPC ........ B25J 9/1653; B25J 9/126; B25J 13/085; B25J 19/027; H02K 7/003; H02K 11/215
See application file for complete search history.

(56) References Cited

U.S. PATENT DOCUMENTS

| | | |
|---|---|---|
| 5,650,704 A | 7/1997 | Pratt et al. |
| 2011/0190934 A1 | 8/2011 | Reiland et al. |
| 2014/0067124 A1* | 3/2014 | Williamson ........... B25J 9/1653 700/258 |

FOREIGN PATENT DOCUMENTS

| | | |
|---|---|---|
| JP | 58-177253 U | 11/1983 |
| JP | 2002-059388 A | 2/2002 |

(Continued)

*Primary Examiner* — Cortez M Cook
(74) *Attorney, Agent, or Firm* — Novick, Kim & Lee, PLLC; Sang Ho Lee; Hyun Woo Shin

(57) ABSTRACT

Provided are an SEA, a method of controlling the SEA and a system using the same. The SEA includes a motor-side rotation unit coupled to a driving motor and rotated by rotatory power of the driving motor, a load-side rotation unit coupled to the motor-side rotation unit to transfer the rotatory power of the driving motor to a load, and at least one pair of elastic members provided in spaces between the motor-side rotation unit and the load-side rotation unit. A frame having accommodation spaces to which the pair of elastic members is fixed is formed in any one of the motor-side rotation unit and the load-side rotation unit.

12 Claims, 11 Drawing Sheets

(51) Int. Cl.
*H02K 11/215* (2016.01)
*B25J 9/12* (2006.01)
*B25J 13/08* (2006.01)
*B25J 19/02* (2006.01)

(56) References Cited

FOREIGN PATENT DOCUMENTS

| | | |
|---|---|---|
| JP | 2004-025319 A | 1/2004 |
| JP | 3961892 B2 * | 8/2007 |
| JP | 2011-083884 A | 4/2011 |
| JP | 2013-022671 A | 2/2013 |
| JP | 2016-129488 A | 7/2016 |
| KR | 10-2015-0073791 A | 7/2015 |
| WO | 2008/015460 A2 | 2/2008 |

* cited by examiner

SERIES ELASTIC ACTUATOR, METHOD FOR CONTROLLING SERIES ELASTIC ACTUATOR AND SYSTEM THEREOF

BACKGROUND OF THE INVENTION

1. Technical Field

The present invention relates to the structure of a series elastic actuator (hereinafter referred to as an "SEA") and a method of controlling the same.

2. Description of the Related Art

With the recent development of the robot technology, there emerges a need for an intelligent robot capable of performing various tasks in place of humans in addition to an industrial robot. Active research and development are carried out on the intelligent robot.

In order to develop the intelligent robot, advanced technologies, such as new materials, semiconductors, artificial robots and sensor software, in addition to the traditional technologies, such as machines and electronics, are necessary. Unlike the existing industrial robot, the intelligent robot may be said to be a robot having functions and performance required for the future market.

Furthermore, the intelligent robot can perform various tasks at places closer to humans. It is necessary to apply a series elastic actuator (SEA) technology to the robot so as to solve a problem that may occur in a cooperation process with humans.

The SEA is a technology for controlling a force and position using elasticity. The SEA controls not only a position like a robot joint, but both a position and force like the muscle of human, and thus enables a robot to operate in a rough place like an uneven ground or adaptively operate in response to external pressure.

The SEA has various types, but a bolt-driven SEA having a structure shown in FIG. 1 is commonly used.

Referring to FIG. 1, a conventional bolt-driven SEA includes a bolt screw 20 rotatably coupled to a driving motor 10, a nut part 30 performing a rectilinear motion left or right in the rotation direction of the bolt screw 20, a rectilinear motion part 50 performing a rectilinear motion left or right through a spring 40 supporting the nut part 30, and an arm 60 coupled to the rectilinear motion part 50.

In the bolt-driven SEA, the bolt screw 20 is directly coupled to the driving motor 10 and rotated. The nut part 30 coupled to the bolt screw 20 performs a rectilinear motion left or right in the rotation direction of the bolt screw 20.

When the bolt screw 20 performs a rectilinear motion, the rectilinear motion part 50 and the arm 60 perform a rectilinear motion in the same direction as the nut part 30 through the nut part 30 and the spring 40 supporting the nut part.

Such a conventional SEA has disadvantages in that the structure is complicated and the size is large because the entire rectilinear motion part including the spring must be designed to move.

Furthermore, it is difficult to apply an SEA having the above structure to a rotary motion. Accordingly, there is a need for a method of controlling an SEA, which is suitable for a rotary motion.

SUMMARY OF THE INVENTION

The present invention has been made keeping in mind the above problems occurring in the prior art, and an object of the present invention is to provide an SEA having a structure capable of an efficient operation.

Furthermore, an object of the present invention is to provide a method of controlling an SEA having a structure suitable for a rotary motion and an SEA system using the same.

A series elastic actuator according to an embodiment of the present invention includes a motor-side rotation unit coupled to a driving motor and rotated by rotary power of the driving motor, a load-side rotation unit coupled to the motor-side rotation unit to transfer the rotary power of the driving motor to a load, and at least one pair of elastic members provided in spaces between the motor-side rotation unit and the load-side rotation unit, wherein a frame having accommodation spaces to which the pair of elastic members is fixed is formed in any one of the motor-side rotation unit and the load-side rotation unit.

A series elastic actuator according to another embodiment of the present invention includes a motor-side rotation unit coupled to a driving motor and rotated by rotary power of the driving motor, a load-side rotation unit coupled to the motor-side rotation unit to transfer the rotary power of the driving motor to a load, and at least one pair of elastic members fixed to spaces between the motor-side rotation unit and the load-side rotation unit. A first frame for supporting the pair of elastic members therein is formed in the motor-side rotation unit, and a second frame for supporting the pair of elastic members on the outside is formed in the load-side rotation unit.

A method of controlling a series elastic actuator according to an embodiment of the present invention includes controlling a series elastic actuator (SEA) including a motor-side rotation unit and load-side rotation unit coupled to transfer rotary power of a driving motor to a load and elastic members. The method includes measuring relative displacement between the motor-side rotation unit and the load-side rotation unit, calculating external torque by an external force applied to the load side based on the measured displacement and hardness (K) of the elastic member, comparing the calculated external torque with a critical torque, and switching a control mode of the SEA to any one of torque control and position control based on a result of the comparison.

At least one pair of the elastic members are provided in spaces between the motor-side rotation unit and the load-side rotation unit, and any one of the pair of elastic members are compressed toward a rotation direction of the motor-side rotation unit.

The steps of the control method may be configured in a computer program form so that they are executed in an SEA system according to an embodiment of the present invention. The corresponding computer program may be stored in a computer-readable medium.

A series elastic actuator system according to an embodiment of the present invention includes a motor-side rotation unit coupled to a driving motor and rotated by rotary power of the driving motor, a load-side rotation unit coupled to the motor-side rotation unit to transfer the rotary power of the driving motor to a load, and at least one pair of elastic members provided in spaces between the motor-side rotation unit and the load-side rotation unit, a sensor part configured to measure relative displacement between the motor-side rotation unit and the load-side rotation unit, and a controller configured to calculate external torque by an external force applied to the load side using the measured displacement and switch a control mode to any one of torque control and position control based on a result of a comparison between the calculated external torque and a critical torque.

DETAILED DESCRIPTION

Figure 1:
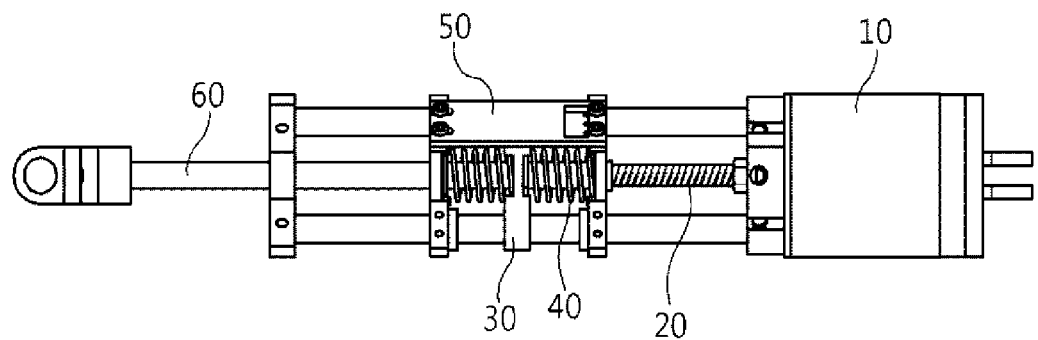
FIG. 1 is a diagram for illustrating an example of the configuration of a conventional SEA.

The following contents illustrate only the principle of the present invention. Although various devices have not been clearly described or illustrated in this specification, those skilled in the art may implement the devices that implement the principle of the present invention and are included in the concept and scope of the present invention. Furthermore, it should be understood that in principle, conditional terms and embodiments listed in this specification are evidently intended only in order for the concept of the present invention to be understood and the range of right of the present invention is not restricted by the specially listed embodiments and states.

Furthermore, it should be understood that all the detailed descriptions that list given embodiments in addition to the principle, aspects, and embodiments of the present invention are intended to include the structural and functional equivalents of such matters. Furthermore, it should be understood that the equivalents include equivalents to be developed in the future, that is, all devices invented to perform the same function by substituting some elements, in addition to known equivalents.

Accordingly, it should be understood that a block diagram of this specification, for example, is indicative of a conceptual viewpoint of an exemplary circuit that materializes the principle of the present disclosure. Likewise, it should be understood that all flowcharts, state change diagrams, and pseudo code may be substantially represented in computer-readable media and are indicative of various processes that are executed by computers or processors regardless of whether the computers or processors are evidently illustrated.

The functions of processors or the functions of various devices illustrated in the drawings that include function blocks illustrated as a similar concept may be provided by the use of hardware capable of executing software in relation to proper software, in addition to dedicated hardware. When being provided by a processor, the function may be provided by a single dedicated processor, a single sharing processor, or a plurality of separated processors, and some of them may be shared.

The above objects, characteristics, and merits will become more apparent from the following detailed description taken in conjunction with the accompanying drawings, and thus those skilled in the art to which the present invention pertains may readily implement the technological spirit of the present invention. Furthermore, in describing the present invention, a detailed description of a known art related to the present invention will be omitted hereunder if it is deemed to make the gist of the present invention unnecessarily vague.

Hereinafter, embodiments of the present invention are described in detail with reference to the accompanying drawings.

Figure 2:
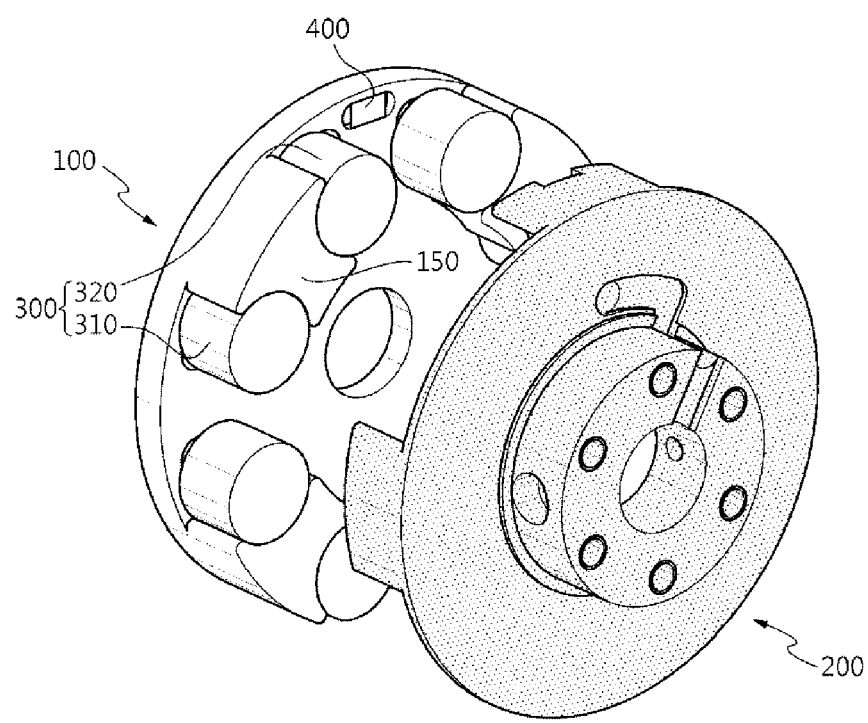
FIGS. 2 and 3 are exploded perspective views for illustrating the configuration of an SEA according to an embodiment of the present invention.
Figure 3:
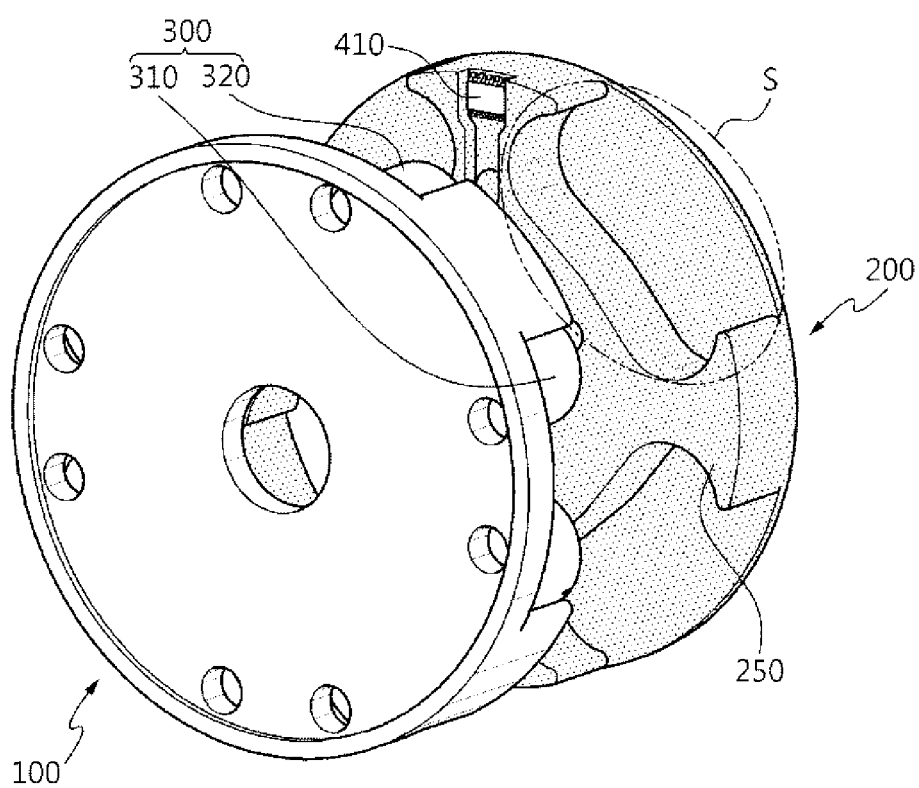

FIGS. 2 and 3 are exploded perspective views for illustrating the configuration of an SEA according to an embodiment of the present invention. The SEA may include a motor-side rotation unit 100, a load-side rotation unit 200 and elastic members 310 and 320.

Referring to FIGS. 2 and 3, the motor-side rotation unit 100 is coupled to a driving motor (not shown) and rotated by rotatory power of the driving motor. The load-side rotation unit 200 functions to transfer the rotatory power of the driving motor to a load.

To this end, the motor-side rotation unit 100 and the load-side rotation unit 200 are coupled. The load-side rotation unit 200 may be configured to rotate in response to the rotation of the motor-side rotation unit 100.

At least one pair of elastic members 300 is provided in the spaces between the motor-side rotation unit 100 and the load-side rotation unit 200.

According an embodiment of the present invention, a frame having an accommodation spaces to which the at least one pair of elastic members 300 is fixed is formed in one of the motor-side rotation unit 100 and the load-side rotation unit 200 together rotated by the rotatory power of the driving motor.

Furthermore, a frame for supporting the pair of elastic members therein may be formed in the other of the motor-side rotation unit 100 and the load-side rotation unit 200.

In this case, any one of the elastic members may be compressed in the relative rotation direction of the motor-side rotation unit 100 on the basis of the load-side rotation unit 200, thereby being capable of implementing an SEA capable of force or torque control in a rotary motion.

The SEA according to an embodiment of the present invention is suitable for a rotary motion and has a simple structure, and thus has an advantage in that it can be implemented in a small size.

The elastic members 310 and 320 may be made of an elastic material, such as silicon or urethane, but the present invention is not limited thereto. The elastic members may be made of various elastic substances or a mixture of two or more elastic substances in addition to silicon and urethane.

The elastic member 310, 320 may have a cylindrical shape as shown in FIG. 2, but is not limited thereto. The elastic member may have various shapes in addition to the cylindrical shape.

The material, shape or size of the elastic members 310 and 320 may be changed, and thus hardness K of the elastic member may vary.

Referring back to FIGS. 2 and 3, an inner frame 150 for supporting the pair of elastic members 300 therein may be formed in the motor-side rotation unit 100. An outer frame 250 for supporting the pair of elastic members 300 on the outside may be formed in the load-side rotation unit 200.

As shown in FIG. 3, accommodation spaces S in which the pair of elastic members 300 can be received and fixed by the outer frame 250 formed in the load-side rotation unit 200 may be provided in the load-side rotation unit 200.

As described above, since the pair of elastic members 300 is supported on the inside and outside by the inner frame 150 of the motor-side rotation unit 100 and the outer frame 250 of the load-side rotation unit 200, the elastic members 310 and 320 can be fixed to the spaces between the coupled motor-side rotation unit 100 and load-side rotation unit 200.

For example, as shown in FIG. 2, when the motor-side rotation unit 100 and the load-side rotation unit 200 are coupled in the state in which the elastic members 310 and 320 have been mounted on the inner frame 150 of the motor-side rotation unit 100, the elastic members 310 and 320 may be compressed and fixed to the accommodation spaces S formed by the outer frame 250 of the load-side rotation unit 200.

As described above, the elastic members 310 and 320 are supported by the inner frame 150 of the motor-side rotation unit 100 and the outer frame 250 of the load-side rotation unit 200 and compressed and fixed to the accommodation spaces S. Accordingly, the elastic members 310 and 320 may not need to be fixed to the motor-side rotation unit 100 or the load-side rotation unit 200 using a separate fixing member.

Accordingly, if the coupling of the motor-side rotation unit 100 and the load-side rotation unit 200 is to be released, the elastic members 310 and 320 are automatically separated, thereby being capable of facilitating the replacement of the elastic members 310 and 320.

The SEA according to an embodiment of the present invention may further include a sensor part for measuring relative displacement between the motor-side rotation unit 100 and the load-side rotation unit 200.

For example, the sensor part may be configured to include a magnetic body 400 and a hall sensor 410 respectively formed at the corresponding positions of the motor-side rotation unit 100 and the load-side rotation unit 200.

Figure 4:
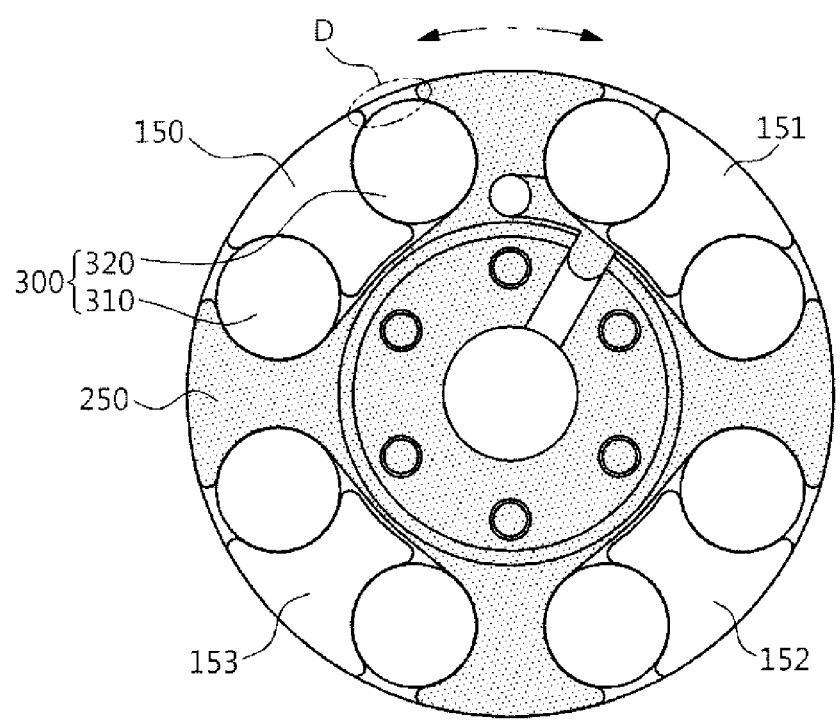
FIG. 4 is a diagram for illustrating an embodiment of a structure in which elastic members are fixed to the spaces between a motor-side rotation unit and a load-side rotation unit.

FIG. 4 is a diagram for illustrating an embodiment of the structure in which the elastic members 310 and 320 are fixed to the spaces between the motor-side rotation unit 100 and the load-side rotation unit 200. A description of an element that belongs to the illustrated elements and that is the same as that described with reference to FIGS. 2 and 3 is omitted hereunder.

Referring to FIG. 4, the pair of elastic members 300 may be fixed to the spaces between the inner frame 150 of the motor-side rotation unit 100 and the outer frame 250 of the load-side rotation unit 200 in the compressed state.

Separated spaces D are present in the outside region of the SEA between the inner frame 150 of the motor-side rotation unit 100 and the outer frame 250 of the load-side rotation unit 200. A portion of the elastic members 310 and 320 may be exposed to the outside through the separated spaces.

When the elastic members 310 and 320 are compressed, they may expand in the direction perpendicular to the compression direction. The separated spaces D may be used as reserved spaces for the perpendicular expansion of the elastic members 310 and 320.

Furthermore, in FIG. 4, four pairs of the elastic members (total of 8) have been illustrated as being formed in the SEA, but the present invention is not limited thereto. Three pairs or five pairs or more of the elastic members may be formed in the SEA, if necessary.

When an external force is applied to the SEA having the above construction, the elastic members are compressed, so relative displacement between occurs between the motor-side rotation unit 100 and the load-side rotation unit 200.

The external force applied to the SEA may mean torque generated by rotatory power of the driving motor, torque generated by a force applied to the load side, or torque according to a reduction or addition between the torques.

More specifically, any one of the pair of elastic members 300 is compressed in the relative rotation direction of the motor-side rotation unit 100 with respect to the load-side rotation unit 200 (or the relative rotation direction of the load-side rotation unit 200 with respect to the motor-side rotation unit 100). Relative displacement corresponding to the compressed elastic members may occur.

Hereinafter, embodiments of the operation of the SEA according to an embodiment of the present invention are described more specifically with reference to FIG. 5. The frames formed in the motor-side rotation unit 100 and the load-side rotation unit 200 are rotated, but have been illustrated as having displacement similar to a straight line in FIG. 5, for convenience sake.

In the state in which torque has not been applied to the SEA, as shown in FIG. 5(a), the elastic members 310 and 320 may have been fixed to the spaces between the inner frame 150 and the outer frame 250 on the basis of a reference position R.

In the state in which the load-side rotation unit 200 has been fixed to the load side so that it does not rotate, when counterclockwise torque is applied to the SEA by rotatory power of the driving motor, as shown in FIG. 5(b), the left elastic member 310 of the pair of elastic members 310 and 320 is compressed, so relative displacement (Δθ) toward the left direction (i.e., counterclockwise) of the reference position R occurs in the motor-side rotation unit 100.

In this case, the torque by the rotatory power of the driving motor may be calculated using Equation 1 below.

$$\tau = k\Delta\theta \quad \text{[Equation 1]}$$

In Equation 1, τ is torque by the rotatory power of the driving motor, K is the hardness of the elastic member, and Δθ is relative displacement for the reference position R.

When the relative displacement (Δθ) is detected using the sensor part (e.g., the magnetic body 400 and the hall sensor 410) provided in the SEA, the torque (τ) by the rotatory power of the driving motor may be calculated according to Equation 1.

In the state in which the load side has been fixed, when clockwise torque is applied to the SEA by rotatory power of the driving motor, as shown in FIG. 5(c), the right elastic member 320 of the pair of elastic members 310 and 320 is compressed, so relative displacement (Δθ) toward the right direction (i.e., clockwise) of the reference position R occurs in the motor-side rotation unit 100.

Even in this case, the torque by the rotatory power of the driving motor may be calculated based on the relative displacement (Δθ) detected by the sensor part according to Equation 1.

Figure 5:
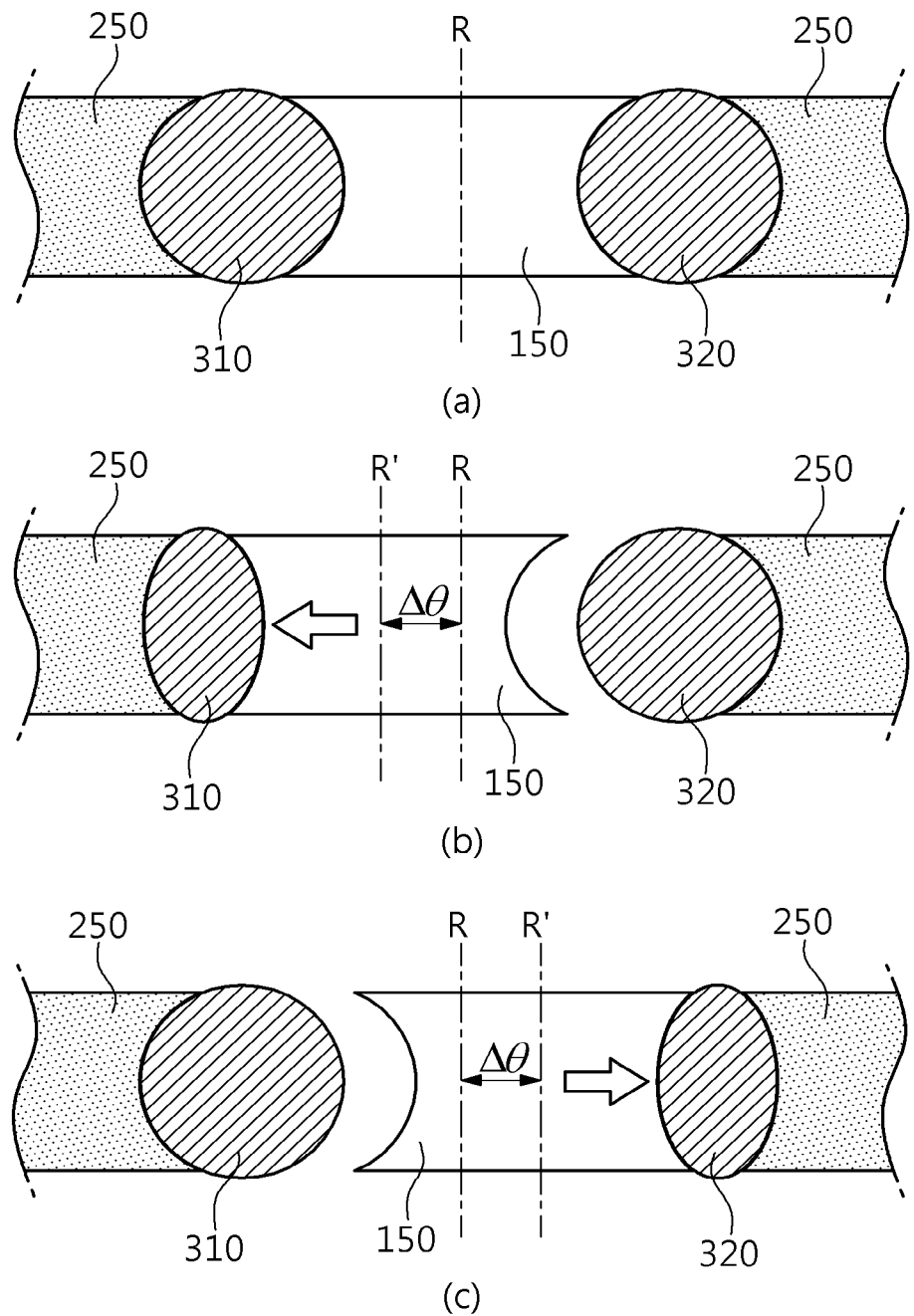
FIG. 5 is a diagram for illustrating embodiments of an operation of the SEA according to the present invention.

In FIGS. 5(*b*) and 5(*c*), the torque (τ) calculated using Equation 1 may indicate torque transferred to the load by the rotatory power of the driving motor.

The operation of the SEA according to an embodiment of the present invention has been described above with reference to FIG. 5 by taking a case where torque is applied by the rotatory power of the driving motor in the state in which the load side has been fixed as an example, but the present invention is not limited thereto. Although torque is applied to the SEA by a force applied to the load side, the SEA according to an embodiment of the present invention may operate as described above with reference to FIG. 5.

For example, when clockwise torque is applied to the SEA on the load side, as shown in FIG. 5(*b*), the left elastic member 310 of the pair of elastic members 310 and 320 is compressed, so relative displacement (Δθ) toward the right direction (i.e., clockwise) of the reference position R occurs in the load-side rotation unit 200.

In contrast, when counterclockwise torque is applied to the SEA on the load side, as shown in FIG. 5(*c*), the right elastic member 320 of the pair of elastic members 310 and 320 is compressed, so relative displacement (Δθ) toward the left direction (i.e., counterclockwise) of the reference position R occurs in the load-side rotation unit 200.

In this case, the torque (τ) applied to the load side may be calculated based on the relative displacement (Δθ) detected by the sensor part using Equation 1.

If torque applied to the load side and torque by rotatory power of the driving motor have opposite directions, the torque (τ) calculated using Equation 1 may indicate a value, that is, the sum of a torque value applied to the load side and a torque value according to rotatory power of the driving motor.

Figure 6:
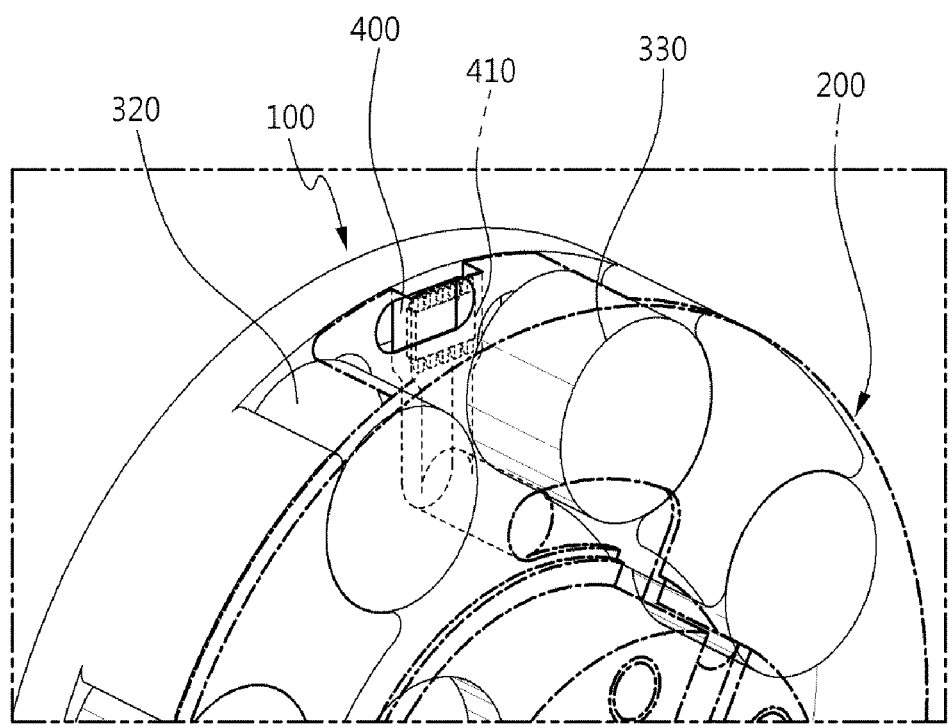
FIG. 6 is a diagram for illustrating an embodiment of the configuration and operation of a sensor part provided in the SEA.

Referring to FIG. 6, in order to measure relative displacement (Δθ) between the motor-side rotation unit 100 and the load-side rotation unit 200, such as that described above, the magnetic body 400 for generating a magnetic field may be positioned in the motor-side rotation unit 100 and the hall sensor 410 may be positioned at a location of the load-side rotation unit 200 that faces the magnetic body 400.

The hall sensor 410 may detect the direction and size of a magnetic field using a hall effect in which a voltage occurs in the direction perpendicular to current and the magnetic field when the magnetic field is applied to a conductor through which current flows.

Accordingly, the direction and size of a magnetic field generated from the magnetic body 400 are measured using the output signal of the hall sensor 410. The relative rotation direction and displacement of the motor-side rotation unit 100 (or relative rotation direction and displacement of the load-side rotation unit 200) may be detected based on a result of the detection.

Figure 7:
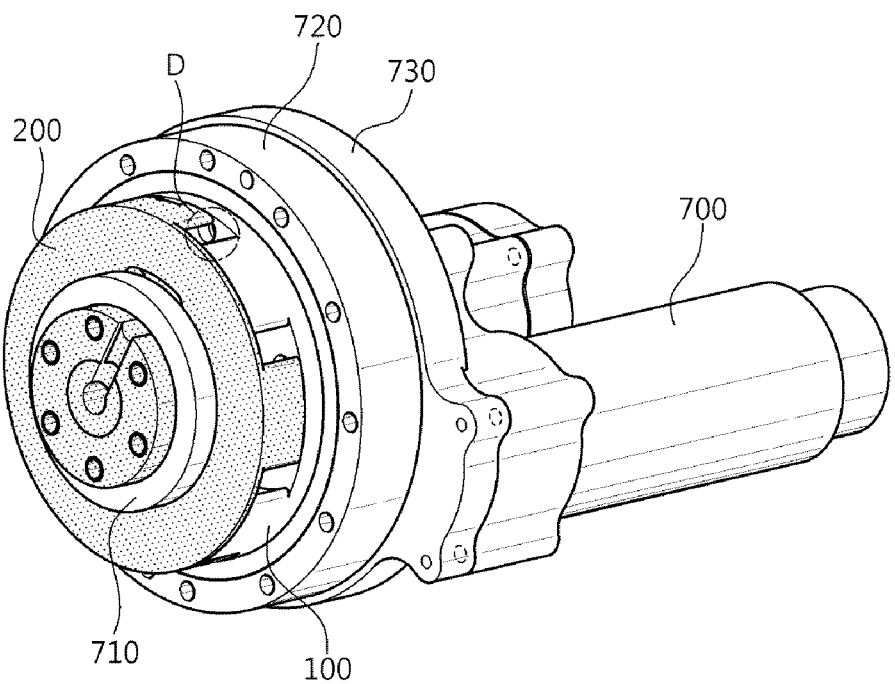
FIGS. 7 and 8 are perspective views showing the configuration of an SEA according to another embodiment of the present invention.
Figure 8:
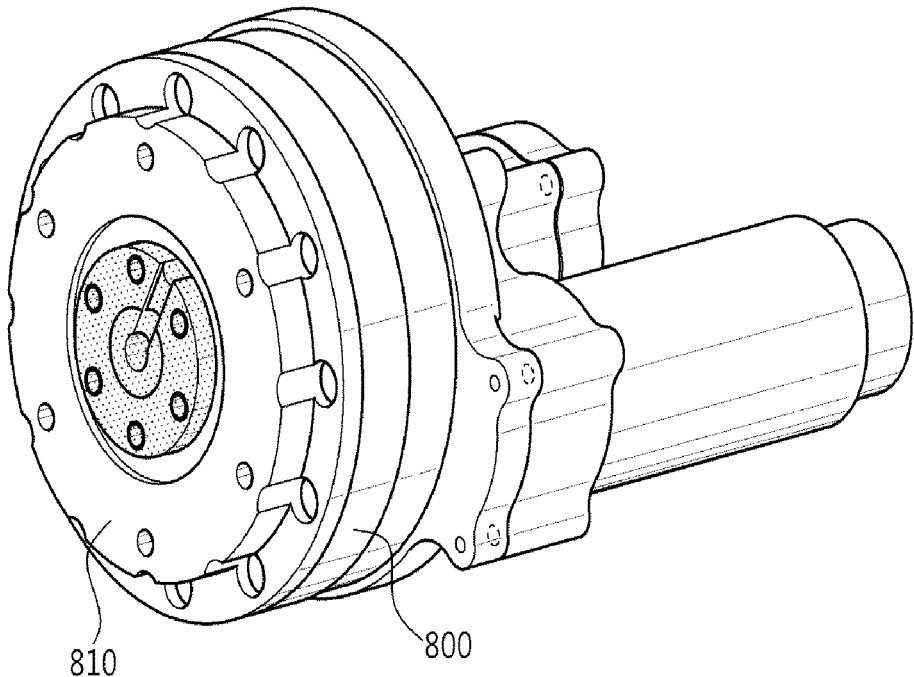

FIGS. 7 and 8 are perspective views showing the configuration of an SEA according to another embodiment of the present invention. A description of an element and operation that belong to the illustrated elements and operation of the SEA and that are the same as those described with reference to FIGS. 2 to 6 is omitted hereunder.

Referring to FIG. 7, a driving motor 700 is coupled to the motor-side rotation unit 100 of the SEA, and a decelerator 720 and a decelerator fixing stage 730 may be additionally coupled to the motor-side rotation unit 100.

Furthermore, although not shown in FIG. 7, a belt (or chain) and pulley for transferring rotatory power of the driving motor 700 to the motor-side rotation unit 100 may be provided in the SEA.

Furthermore, a bearing 710 may be coupled to the load-side rotation unit 200 of the SEA.

Referring to FIG. 8, a bearing fixing stage 800 and a bearing cover 810 may be coupled the SEA coupled as shown in FIG. 7.

FIGS. 7 and 8 illustrate an embodiment of the configuration of the SEA coupled to the driving motor. An SEA according to an embodiment of the present invention is not limited to the SEA of FIGS. 7 and 8. Some of the illustrated elements may be omitted or an additional element may be added, if necessary.

According to another embodiment of the present invention, a force (or torque) and position in the joint of a robot or other industrial machines may be together controlled using an SEA having a configuration, such as that described with reference to FIGS. 2 to 8.

For example, a motion of a robot joint may be controlled using torque (τ) calculated based on relative displacement (Δθ) between the motor-side rotation unit 100 and the load-side rotation unit 200.

More specifically, an external force applied to the load side depending on relative displacement between the motor-side rotation unit 100 and the load-side rotation unit 200 may be detected. The control mode of the SEA may switch to torque control or position control based on a result of a comparison between the external force and a reference value.

An SEA system according to an embodiment of the present invention may be configured to include an SEA having a configuration, such as that described with reference to FIGS. 2 to 8, and a controller for controlling the SEA.

Hereinafter, embodiments of a method of controlling the SEA are described more specifically with reference to FIGS. 9 to 14.

Figure 9:
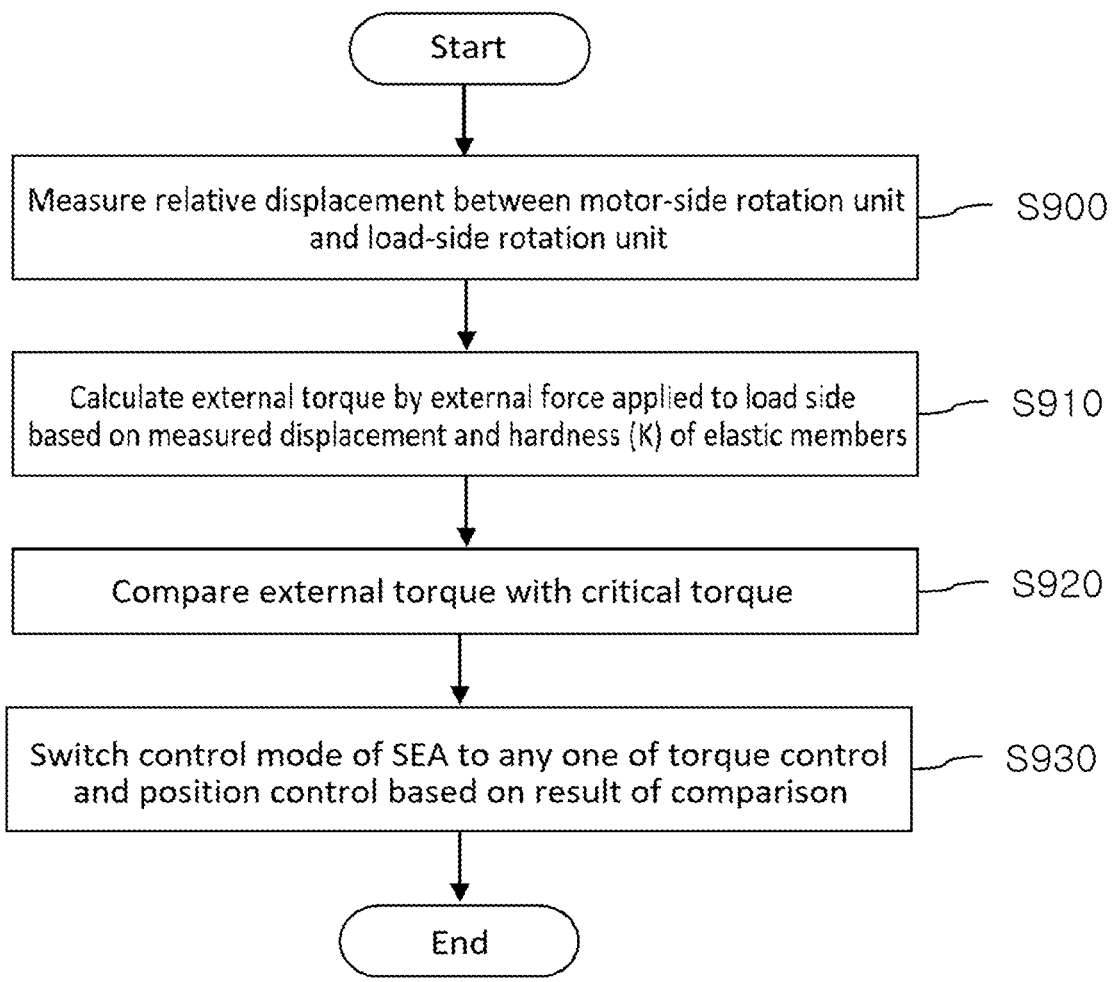
FIG. 9 is a flowchart illustrating a method of controlling the SEA according to an embodiment of the present invention.

FIG. 9 is a flowchart illustrating a method of controlling the SEA according to an embodiment of the present invention, and shows a method for the controller of the SEA system to control the operation of the SEA according to an embodiment of the present invention.

Referring to FIG. 9, the controller measures relative displacement between the motor-side rotation unit 100 and load-side rotation unit 200 of the SEA (step S900).

At step S900, as described above, relative displacement between the motor-side rotation unit 100 and the load-side rotation unit 200 may be measured using the magnetic body 400 and the hall sensor 410 respectively positioned at the corresponding positions of the motor-side rotation unit 100 and the load-side rotation unit 200.

The controller calculates external torque by an external force applied to the load side based on the displacement measured at step S900 and hardness K of the elastic members provided in the SEA (step S910).

Figure 10:
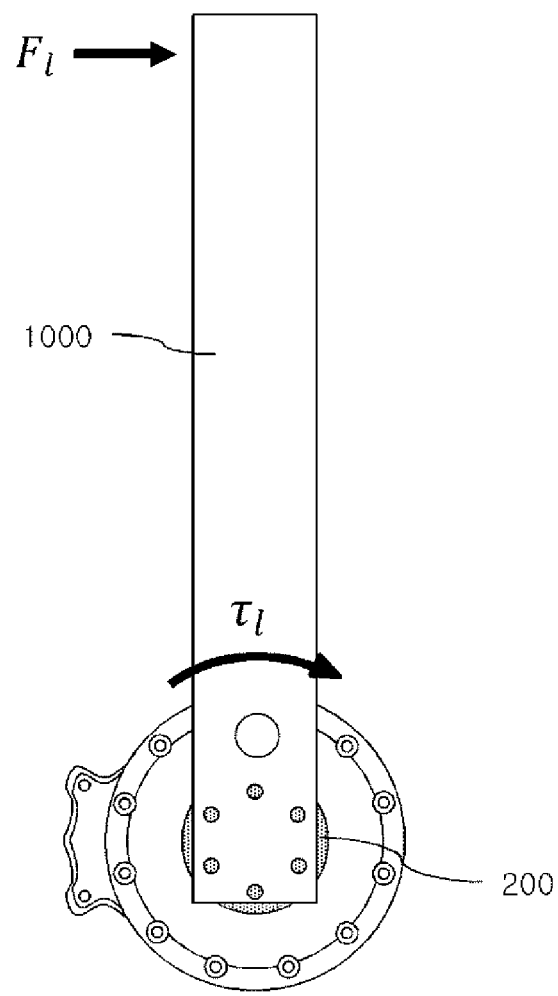
FIG. 10 is a diagram for illustrating an embodiment of the operation of the SEA when an external force is applied to a load.

Referring to FIG. 10, when an external force ($F_l$) is applied to a load 1000 coupled to the load-side rotation unit 200, torque ($τ_l$) that rotates the load 1000 by the external force ($F_l$) occurs.

For example, torque ($τ_l$) may occur when external force ($F_l$) is applied to the load 1000 that does not rotate and maintains a current position, or torque ($τ_l$) may occur when external force ($F_l$) having a direction opposite the rotation direction of the load 1000 that rotates until it reaches a specific position is applied to the load 1000.

Alternatively, torque ($\tau_l$) may occur when external force ($F_l$) having the same direction as the rotation direction of the load 1000 is applied to the load 1000 that rotates.

As described above, the external torque ($\tau_l$) by the external force ($F_l$) applied to the load 1000 compresses any one of the pair of elastic members 310 and 320, so relative displacement between the motor-side rotation unit 100 and the load-side rotation unit 200 may occur.

Accordingly, the external torque ($\tau_l$) occurring due to the external force ($F_l$) may be calculated based on the relative displacement ($\Delta\theta$) between the motor-side rotation unit 100 and the load-side rotation unit 200 and the hardness K of the elastic members using Equation 1.

Thereafter, the controller compares the external torque calculated at step S910 with preset critical torque (step S920), and switches the control mode of the SEA to torque control or position control based on a result of the comparison (step S930).

Figure 11:
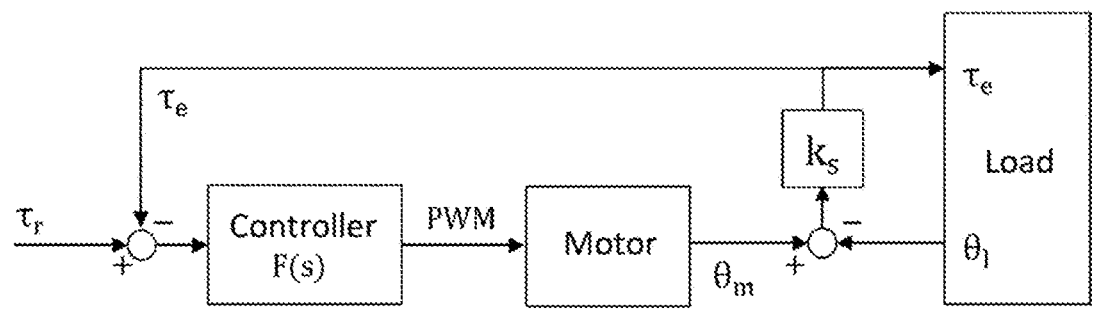
FIG. 11 is a diagram for illustrating an embodiment of a torque control method.

In this case, in the torque control, the driving motor is controlled so that the load 1000 connected to the load-side rotation unit 200 of the SEA generates a given torque (or force). As shown in FIG. 11, the controller may receive feedback for torque ($\tau_e$) transferred to the load side, may compare the torque ($\tau_e$) with reference torque ($\tau_r$), and may control the driving motor.

For example, the controller may perform the torque control to control the driving motor so that the reference torque ($\tau_r$) continues to be transferred to the load 1000 by performing pulse width modulation (PWM) control using Equation 2.

$$\text{Controller} = \begin{cases} P(s) & \tau_l \le \tau_{th} \\ F(s) & \tau_l > \tau_{th} \end{cases} \quad [\text{Equation 2}]$$

In Equation 2, F(s) indicates the torque control function of a PID controller, and KP, KD and KF indicate parameters for PID control.

A method for the controller to perform the torque control has been described above with reference to FIG. 11 and Equation 2, but the present invention is not limited thereto. The controller may control driving motor using various known torque control methods.

Figure 12:
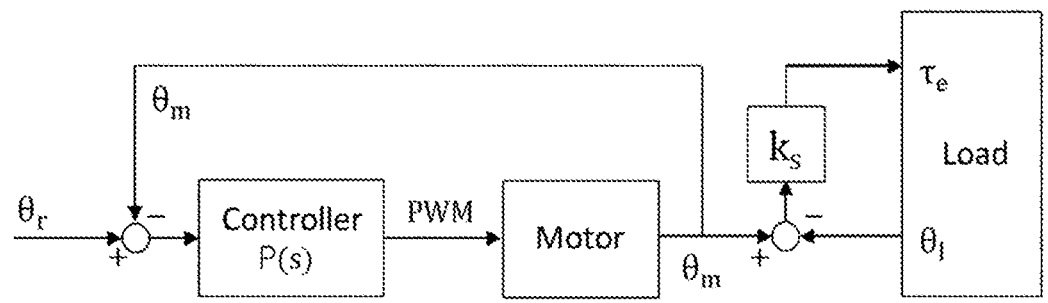
FIG. 12 is a diagram for illustrating an embodiment of a position control method.

In the position control, the driving motor is controlled so that the load 1000 coupled to the load-side rotation unit 200 of the SEA is moved as much as a given rotation angle (or position). As shown in FIG. 12, the controller may receive the rotation angle ($\theta_m$) of the motor-side output stage as feedback, may compare the received rotation angle ($\theta_m$) with a reference angle ($\theta_r$), and may control the driving motor.

For example, the controller may perform the position control to control the driving motor so that the load 1000 is rotated as much as the reference angle ($\theta_r$) by performing PWM control using Equation 3 below.

$$F(s) = K_P K_F(\tau_r - \tau_e) + K_D K_F s(\tau_r - \tau_e) \quad [\text{Equation 3}]$$

In Equation 3, P(s) indicates the position control function of the PID controller, and KP and KD indicate parameters for PID control.

A method for the controller to perform the position control with reference to FIG. 12 and Equation 3 has been described above, but the present invention is not limited thereto. The controller may control the driving motor using various known position control methods.

Equation 4 below shows an embodiment of a method for the controller to change the control mode of the SEA between the torque control and the position control based on a result of the comparison between the external torque ($\tau_l$) and the critical torque ($\tau_{th}$) at step S930.

$$P(s) = K_P(\theta_r - \theta_m) + K_D s(\theta_r - \theta_m) \quad [\text{Equation 4}]$$

Referring to Equation 4, when external torque ($\tau_l$) is a critical torque ($\tau_{th}$) or less, the controller may switch the control mode of the SEA to the position control.

When the external torque ($\tau_l$) is greater than the critical torque ($\tau_{th}$), the controller may switch the control mode of the SEA to the torque control.

For example, when torque ($\tau_l$) attributable to an external force ($F_l$) occurs during the position control in which the load 1000 does not rotate, the driving motor may generate torque having an opposite direction until the external torque ($\tau_l$) reaches a critical torque ($\tau_{th}$), so the position control is maintained. When the external torque ($\tau_l$) exceeds the critical torque ($\tau_{th}$), the position control may switch to the torque control.

Thereafter, if the external force ($F_l$) is removed and the external torque ($\tau_l$) drops to the critical torque ($\tau_{th}$) or less, the torque control may switch to the position control, so the load 1000 returns to the original position by the rotation of the driving motor.

During the position control in which the load 1000 rotates at a given angle, when torque ($\tau_l$) having an opposite direction occurs due to an external force ($F_l$), the driving motor may continue to rotate the load 1000 until the external torque ($\tau_l$) reaches the critical torque ($\tau_{th}$), so the position control is maintained. When the external torque ($\tau_l$) exceeds the critical torque ($\tau_{th}$), the position control may switch to the torque control.

Thereafter, if the external force ($F_l$) is removed and the external torque ($\tau_l$) drops to the critical torque ($\tau_{th}$) or less, the torque control switches to the position control again, so the load 1000 is rotated at a given angle by the driving motor.

Furthermore, during the position control in which the load 1000 is rotated at the given angle, when torque ($\tau_l$) having the same direction occurs due to an external force ($F_l$), the driving motor continues to rotate the load 1000 until the external torque ($\tau_l$) reaches the critical torque ($\tau_{th}$), so the position control is maintained. When the external torque ($\tau_l$) exceeds the critical torque ($\tau_{th}$), the position control may switch to the torque control.

Thereafter, if the external force ($F_l$) is removed and the external torque ($\tau_l$) drops to the critical torque ($\tau_{th}$) or less, the torque control switches to the position control again, so the load 1000 is rotated at a given angle by the driving motor.

As described above, if the control mode switches between the position control and the torque control based on the critical torque ($\tau_{th}$), oscillation may occur in a transition region near the critical torque ($\tau_{th}$).

Figure 13:
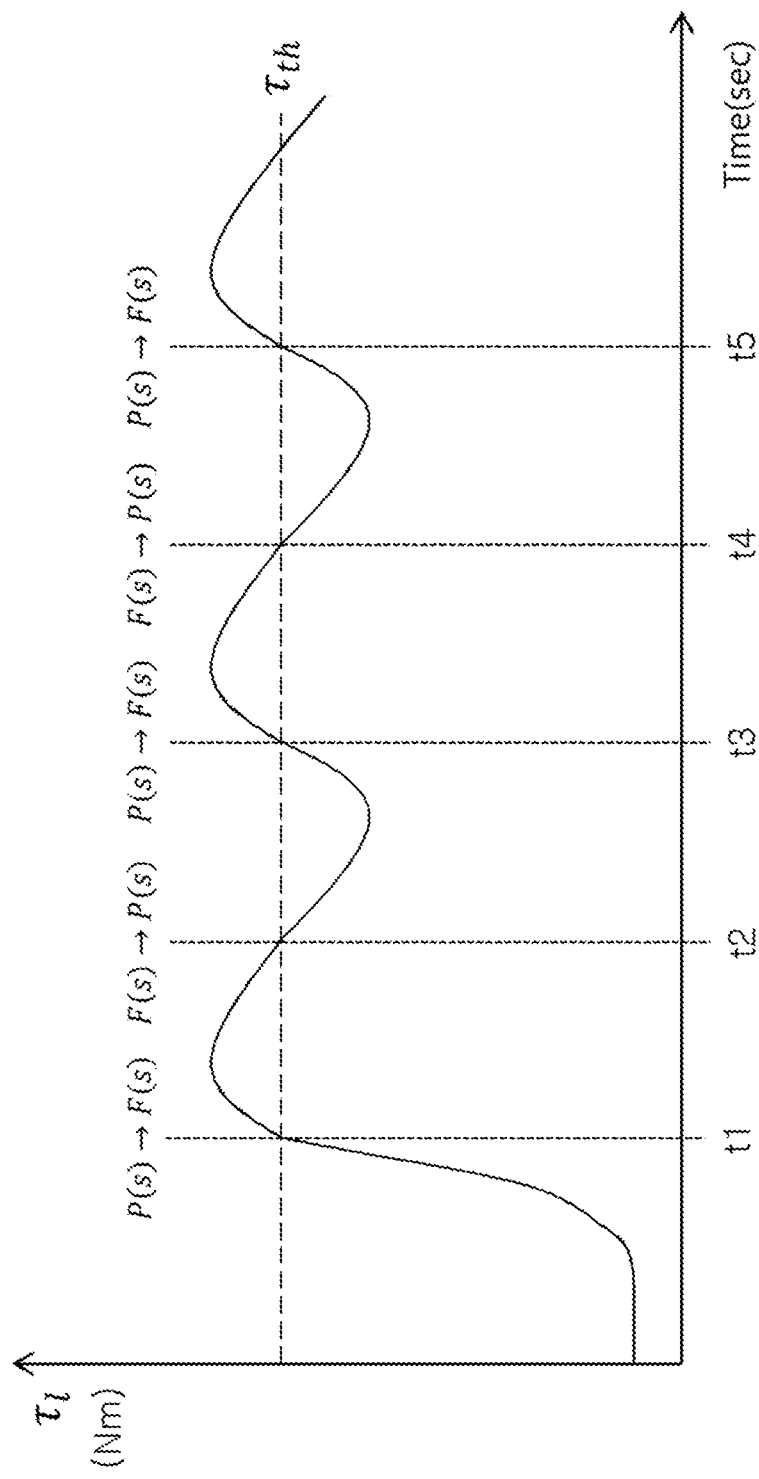
FIG. 13 is a graph for illustrating a first embodiment of a transition method between torque control and position control.

Referring to FIG. 13, the position control switches to the torque control at a point of time (t1) at which the external torque ($\tau_l$) increases and exceeds the critical torque ($\tau_{th}$). After the control mode switches to the torque control, torque ($\tau_l$) may be reduced.

The torque control switches to the position control again at a point of time (t2) at which the torque ($\tau_l$) decreases and reaches the critical torque ($\tau_{th}$). After the control mode switches to the position control, torque ($\tau_l$) may increase.

As described above, the control mode repeatedly switches between the position control and the torque control in the transition region near the critical torque ($\tau_{th}$), so oscillation may occur on the load side.

According to another embodiment of the present invention, in order to reduce such oscillation in the transition region, if external torque ($\tau_l$) is decreased to a value or less obtained by subtracting given torque ($\tau_{hys}$) from the critical torque ($\tau_{th}$), the controller may operate so that the control mode of the SEA switches from the torque control to the position control.

$$\text{Controller} = \begin{cases} P(s) \to F(s) & \tau_l = \tau_{th} \\ F(s) \to P(s) & \tau_l = \tau_{th} - \tau_{hys} \end{cases} \quad \text{[Equation 5]}$$

Referring to Equation 5, when the external torque ($\tau_l$) reaches the critical torque ($\tau_{th}$), the control mode switches from the position control to the torque control. If the external torque ($\tau_l$) decreases up to a value ($\tau_{th}$-$\tau_{hys}$) obtained by subtracting given torque from the critical torque, the control mode may switch to from the torque control to the position control.

Figure 14:
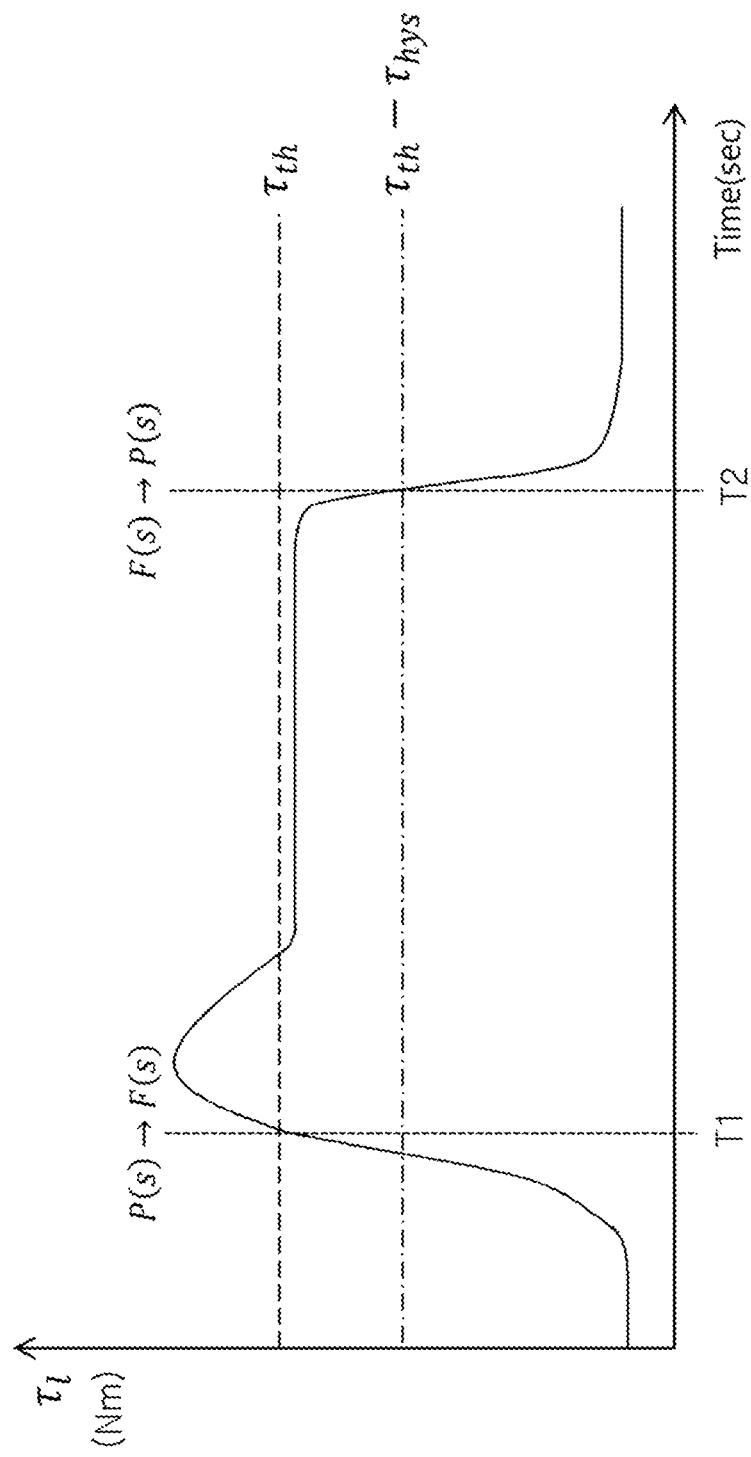
FIG. 14 is a graph for illustrating a second embodiment of a transition method between torque control and position control.

Referring to FIG. 14, the position control switches to the torque control at a point of time (T1) at which the external torque ($\tau_l$) increases and exceeds the critical torque ($\tau_{th}$). After the control mode switches to the torque control, the torque ($\tau_l$) may be decreased.

At a point of time at which the torque ($\tau_l$) decreases and reaches the critical torque ($\tau_{th}$), the control mode does not switch and maintains the torque control. Accordingly, the torque ($\tau_l$) transferred to the load 1000 may maintain a desired reference torque value.

Thereafter, at a point of time (T2) at which the external force (F$_l$) is removed and the external torque ($\tau_l$) reaches a value ($\tau_{th}$-$\tau_{hys}$) obtained by subtracting given torque from the critical torque, the torque control may switch to the position control.

In accordance with an embodiment of the present invention, the frame having the accommodation spaces to which the pair of elastic members is fixed is formed in any one of the motor-side rotation unit and the load-side rotation unit rotated along with rotatory power of the driving motor. Accordingly, the SEA suitable for a rotary motion and having a simple structure can be provided because any one of the elastic members is compressed in the relative rotation direction of the motor-side rotation unit. Accordingly, a small-sized SEA can be implemented.

In accordance with another embodiment of the present invention, an external force applied to the load side is detected based on relative displacement between the motor-side rotation unit and the load-side rotation unit. The control mode of the SEA switches to any one of the torque control and the position control based on a result of a comparison between an external force and a reference value. Accordingly, the SEA can stably control a force and position according to circumstances.

The aforementioned methods according to the embodiments of the present invention may be produced in the form of a program to be executed by a computer. The program may be stored in a computer-readable recording medium. The computer-readable recording medium may include ROM, RAM, CD-ROM, a magnetic tape, a floppy disk, and an optical data storage device, for example. Furthermore, the computer-readable recording medium includes media implemented in the form of carrier waves (e.g., transmission through the Internet).

The computer-readable recording medium may be distributed to computer systems connected over a network, and computer-readable code may be stored and executed in a distributed manner. Furthermore, a functional program, code and code segments for implementing the method may be easily reasoned by programmers those skilled in the art to which the present invention pertains.

Furthermore, although the embodiments of the present invention have been illustrated and described above, the present invention is not limited to the aforementioned given embodiments, and may be modified in various ways by a person having ordinary skill in the art to which the present invention pertains without departing from the gist of the present invention claimed in the claims. Such modified embodiments should not be individually understood from the technical spirit or prospect of this specification.

What is claimed is:

1. A method of controlling a series elastic actuator (SEA) comprising a motor-side rotation unit, a load-side rotation unit, and at least one elastic member, the motor-side rotation unit and the load-side rotation unit being coupled each other to transfer rotatory power of a driving motor to a load, the method comprising:
   measuring relative displacement between the motor-side rotation unit and the load-side rotation unit;
   calculating external torque by an external force applied to the load side based on the measured displacement and hardness (K) of the elastic member;
   comparing the calculated external torque with a critical torque; and
   switching a control mode of the SEA to any one of torque control and position control based on a result of the comparison.

2. The method of claim 1, wherein the displacement is measured using a magnetic body and hall sensor respectively positioned at corresponding positions of the motor-side rotation unit and the load-side rotation unit.

3. The method of claim 1, wherein when the calculated external torque is greater than the critical torque, the control mode switches to the torque control for controlling torque transferred to the load side.

4. The method of claim 1, wherein when the calculated external torque is less than or equal to the critical torque, the control mode switches to the position control for controlling a rotation angle of the load side.

5. The method of claim 4, wherein the rotation angle of the load side is controlled using a rotation angle of the fed-back motor-side.

6. The method of claim 1,
   wherein when the external torque increases to a value greater than the critical torque, the control mode switches from the position control to the torque control, and
   when the external torque decreases to a value or less obtained by subtracting given torque from the critical torque, the control mode switches from the torque control to the position control.

7. The method of claim 1, wherein at least one pair of the elastic members is provided in spaces between the motor-side rotation unit and the load-side rotation unit.

8. The method of claim 7, wherein any one of the pair of elastic members is compressed toward a rotation direction of the motor-side rotation unit.

9. A series elastic actuator (SEA) system, comprising:
a motor-side rotation unit coupled to a driving motor and rotated by rotatory power of the driving motor;
a load-side rotation unit coupled to the motor-side rotation unit to transfer the rotatory power of the driving motor to a load; and
at least one pair of elastic members provided in spaces between the motor-side rotation unit and the load-side rotation unit;
a sensor part configured to measure relative displacement between the motor-side rotation unit and the load-side rotation unit; and
a controller configured to calculate external torque by an external force applied to the load side using the measured displacement and switch a control mode to any one of torque control and position control based on a result of a comparison between the calculated external torque and a critical torque,
wherein the controller is further configured to:
switch the control mode from the position control to the torque control when the external torque increases to a value greater than the critical torque; and
switch the control mode from the torque control to the position control when the external torque decreases to be less than or equal to a value obtained by subtracting given torque from the critical torque.

10. The SEA system of claim 9, wherein the controller controls a rotation angle of the load side using a rotation angle of the fed-back motor-side when the control mode is the position control.

11. The SEA system of claim 9, wherein a frame having accommodation spaces to which the pair of elastic members is fixed is formed in any one of the motor-side rotation unit and the load-side rotation unit.

12. A series elastic actuator (SEA) system, comprising:
a motor-side rotation unit coupled to a driving motor and rotated by rotatory power of the driving motor;
a load-side rotation unit coupled to the motor-side rotation unit to transfer the rotatory power of the driving motor to a load; and
at least one pair of elastic members provided in spaces between the motor-side rotation unit and the load-side rotation unit;
a sensor part configured to measure relative displacement between the motor-side rotation unit and the load-side rotation unit; and
a controller configured to calculate external torque by an external force applied to the load side using the measured displacement and switch a control mode to any one of torque control and position control based on a result of a comparison between the calculated external torque and a critical torque,
wherein the controller controls a rotation angle of the load side using a rotation angle of the fed-back motor-side when the control mode is the position control.

* * * * *